United States Patent [19]

Clerc et al.

[11] Patent Number: 4,782,337
[45] Date of Patent: Nov. 1, 1988

[54] MATRIX DISPLAY DEVICE COMPRISING TWO GROUPS OF ROW ELECTRODES AND TWO COLUMN ELECTRODES FOR IMAGE ELEMENT AND ITS CONTROL PROCESS

[75] Inventors: Jean-Frédéric Clerc, Saint Egreve; Aimé Perrin, Saint Ismier, both of France

[73] Assignee: Commissariat a l'Energie Atomique, Paris, France

[21] Appl. No.: 79,212

[22] Filed: Jul. 29, 1987

[30] Foreign Application Priority Data

Aug. 1, 1986 [FR] France .................. 86 11230

[51] Int. Cl.$^4$ ............................................. G09G 3/20
[52] U.S. Cl. ................................. 340/752; 340/784
[58] Field of Search .................. 340/752, 756, 758, 340/759, 763, 765, 766, 771, 774–779, 783, 784, 805, 811; 350/330, 331 R, 334, 336

[56] References Cited

U.S. PATENT DOCUMENTS

| 4,335,937 | 6/1982 | Takamatsu et al. | 350/336 |
|---|---|---|---|
| 4,449,125 | 5/1984 | Clerc et al. | 340/784 |
| 4,481,511 | 11/1984 | Hanmura et al. | 340/784 |
| 4,543,573 | 9/1985 | Fuyama et al. | 340/784 |
| 4,582,395 | 4/1986 | Morozumi | 340/784 |
| 4,617,563 | 10/1986 | Fujiwara et al. | 340/784 |
| 4,626,072 | 12/1986 | Clerc et al. | 350/336 |
| 4,651,148 | 3/1987 | Takeda et al. | 340/784 |

FOREIGN PATENT DOCUMENTS 0143039 5/1985 European Pat. Off. .
8502931 7/1985 World Int. Prop. O. .

OTHER PUBLICATIONS

Proceedings of the Society for Information Display, S. Bisotto, Patent Abstracts of Japan (Nippon Denki K.K.).
Sid International Symposium Digest of Technical Papers, C. Kornfeld.

*Primary Examiner*—Gerald L. Brigance
*Assistant Examiner*—Richard Hjerpe
*Attorney, Agent, or Firm*—Nutter, McClennen & Fish

[57] ABSTRACT

A matrix display device and control therefore applicable to liquid crystal displays incorporates two groups of row electrodes and two column electrodes per image element. Each row conductor is connected by k×m switches to m groups of k parallel electrodes of a first family and to m groups of k parallel electrodes of a second family which alternate with one another, in such a way that each switch is connected to an electrode of the first family, to an electrode of the second family and to the row conductor. An image element is defined by the overlap zone of two column conductors of a first and a second family with two groups respectively of k electrodes of a first and a second family connected by k switches to the corresponding row conductor.

Application to liquid crystal display means.

11 Claims, 4 Drawing Sheets

MATRIX DISPLAY DEVICE COMPRISING TWO GROUPS OF ROW ELECTRODES AND TWO COLUMN ELECTRODES FOR IMAGE ELEMENT AND ITS CONTROL PROCESS

BACKGROUND OF THE INVENTION

The present invention relates to a matrix display device comprising two groups of row electrodes and two column electrodes per image or picture element, as well as to its control process.

The invention is used in optoelectronics and mainly in the control of liquid crystal cells used more particularly as a convertor of electrical information into optical information, in the real time processing of optical images and for analog display purposes.

More specifically, the invention relates to a matrix display device using a display material having an optical property and incorporating a plurality of image elements controlled by switches, such as thin film transistors.

The optical property of the display material used is e.g. opacity, refractive index, transparency, diffusion, diffraction, convergence, etc. Moreover, said material can be solid, liquid, amorphous or crystalline.

Figure 1:
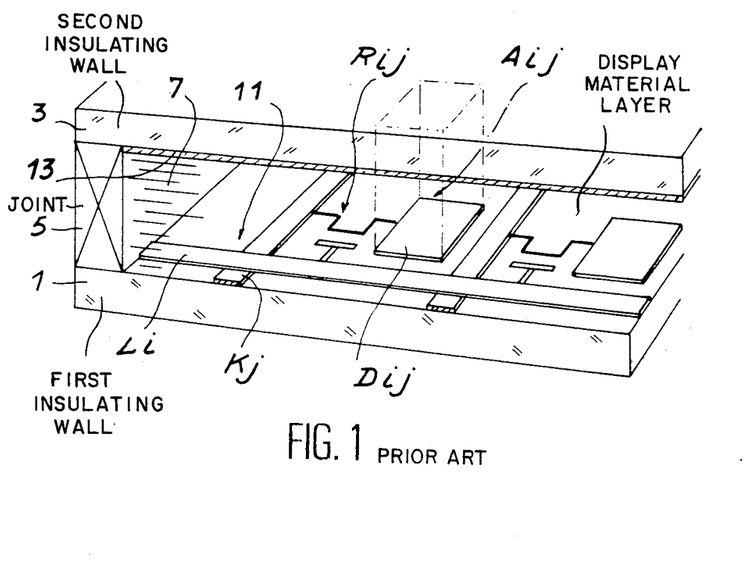
FIG. 1, already described, is a diagrammatic view of a per se known display device.

FIG. 1 diagrammatically shows a known matrix display device of this type. FIG. 1 shows two insulating walls, namely a first wall 1 and a second wall 3 which face one another and which are kept spaced and sealed by a joint 5. Between said walls is placed a display material layer 7 having an optical property.

Over the inner face of one of the walls 1 are distributed n parallel row conductors, designated $L_i$ and m parallel column conductors designated $K_j$, which cross the row conductors, i and j being integers such that $1 \leq i \leq n$ and $1 \leq j \leq m$. The row and column conductors carry electrical signals appropriate for exciting material 7 and generated by not shown addressing means. At the intersection 11 of each row conductor $L_i$ and each column conductor $K_j$ is provided a switch $R_{ij}$, such as a thin film transistor, connected to an electrode $D_{ij}$.

Moreover, the inner face of the other wall 3 is covered with a conductive material serving as a counterelectrode 13, which is raised to a reference potential.

An image or picture element $A_{ij}$ is defined in said device by the overlap region of an electrode $D_{ij}$ and the counterelectrode 13, electrode $D_{ij}$ and counterelectrode 13 respectively forming the two coatings of a capacitor between which is placed the display material.

In the particular case where the display material is a liquid crystal film, in order to prevent deterioration thereof, the counterelectrode 13 is raised to a reference potential, whose value is periodically inverted and the row conductors and column conductors carry alternating voltages.

In order to select a particular image element $A_{ij}$ of the device, an electrical signal is supplied on row conductor $L_i$, which selects the conductive state of the group of transistors connected to said row conductor and in particular the conductive state of transistor $R_{ij}$ associated with said image element. This transistor then transmits to the electrode $D_{ij}$ to which it is connected the electrical signal from column $K_j$. Between electrode $D_{ij}$ and counterelectrode 13, there is an electrical field which will cause a collective orientation of the molecules, particularly the liquid crystal inserted between the capacitor coatings formed by electrode $D_{ij}$ and counterelectrode 13, when the signal from column $K_j$ is equal to or exceeds the threshold voltage corresponding to the minimum value necessary for exciting material 7. This collective orientation will modify the optical property from material 7 to image element $A_{ij}$.

By utilizing the selective orientation of the molecules and the punctiform excitation of the display material, an image is made to appear on the complete display device by defining it point by point.

Such a display device makes it possible to address a very large number of image elements. However, such means have a large number of defective image elements either in the form of whole columns and/or rows of defective image elements, or isolated defective image elements.

The poor operation of a row and a column of image elements is due either to short-circuits between the row of conductors and column conductors which cross one another, each short-circuit putting out of order one row and one column of image elements, or to short-circuited transistors, each of which also puts out of order one row and one column of image elements. The unsatisfactory operation of an isolated image element is e.g. due to an insulation defect of the transistor corresponding to said element.

In order to overcome these shortcomings, numerous display devices have been constructed in which the number of row conductors and column conductors addressing an image element has been multiplied leading to an increase in the number of transistors associated with an image element. This solution suffers from numerous disadvantages, such as e.g. increase in the complexity and cost of the display means and without eliminating all the fault and error sources. Thus, if e.g. the column conductors of a double redundant pattern corresponding to the addressing of the same column of image elements are respectively associated with a defective transistor, all the column of image elements will be out of order. Moreover, such devices do not eliminate isolated defective image elements.

In addition, this solution requires the use of tests during the construction of the display device, in order to reveal the defective elements and disconnect them, which also increases the manufacturing costs of the display device and which constitutes a source of subsequent faults.

FR-A-2553 218 describes a matrix display device obviating the crossing or intersection of row conductors and column conductors on the inner face of one of the walls of the display device. For this purpose, on one of the walls of the display device are arranged parallel column conductors with which are associated electrodes disposed in accordance with a first matrix and on the other wall are disposed parallel row conductors connected by transistors to a second matrix of electrodes facing the first matrix of electrodes. An image element of this device is defined by the overlap zone of an electrode of the first matrix and an electrode of the second matrix.

This display device makes it possible to obviate short-circuits between a row conductor and a column conductor, but a short-circuited transistor can still put out of operation a complete row conductor and therefore a row of image elements. Moreover, this device does not make it possible to obviate isolated defective image elements.

French patent application FR-A-2581783 in the name of the same Applicant describes a matrix display device making it possible to avoid any intersection between row conductors and column conductors on the inner face of a wall of the display device and prevents a short-circuited transistor from putting out of operation a row or column of image elements.

On the inner face of one of the walls of said device are arranged n parallel row conductors, each row conductor being connected to m transistors, each connected to an electrode of a first family and to an electrode of a second family, said electrodes being juxtaposed with said row conductor. On the inner face of the other wall of said device are arranged a first family of m parallel column conductors and a second family of m parallel column conductors, the column conductors of the first family alternating with the column conductors of the second family, one of the two families of column conductors being raised to a reference potential. The column conductors of the first and second families intersect with the row conductors, each column conductor of the first family facing n electrodes of the first family and each column conductor of the second family faces n electrodes of the second family. An image element of said device is defined by the overlap zone of two column conductors respectively of the first and second families with two electrodes respectively of the first and second families connected by a transistor to a row conductor. However, such a device does not make it possible to obviate poor isolated image elements.

The problem of the present invention is therefore to obviate this disadvantage by realizing a device making it possible to avoid the deficiency of both lines or columns of image elements and isolated image elements, particularly by dividing each of the two electrodes and the transistor of an image element of the display device described in FR-A-2 581 783 into several small electrodes and as many small transistors.

SUMMARY OF THE INVENTION

More specifically, the present invention relates to a matrix display device comprising an electro-optical material having an optical property inserted between first and second insulating walls, whereof at least one is transparent and which are kept spaced from one another, wherein on the inner face of the first wall are arranged n parallel row conductors, each row conductor being connected by $k \times m$ switches to $k \times m$ electrodes of a first family grouped into m groups of k parallel electrodes each and $k \times m$ electrodes of a second family grouped into m groups of k parallel electrodes each, the m groups of electrodes of the first family and the m groups of electrodes of the second family being juxtaposed with said row conductor and alternating with one another in such a way that each electrode $E_{ijl}$ of a group $P_{ij}$ of electrodes of the first family and each electrode $E'_{ijl}$ of a group $P'_{ij}$ of electrodes of the second family are connected by a switch $T_{ijl}$ to a row conductor $N_i$ with i, j and l being integers such that $1 \leq i \leq n$, $1 \leq j \leq m$ and $1 \leq l \leq k$ and wherein on the inner face of the second wall are arranged a first family of m parallel column conductors and a second family of m parallel column conductors, the column conductors of the second family alternating with the column conductors of the first family, one of the two families of column conductors being raised to a reference potential by a polarizing means, the column conductors of the first and second families intersecting with the row conductors, each column conductor of the first family facing n groups of electrodes of the first family and each column conductor of the second family facing n groups of electrodes of the second family, an image element being defined by the overlap zone of two column conductors respectively of the first and second families with respectively a group of k electrodes of the first family and a group of k electrodes of the second family connected by k switches to the corresponding row conductor, said conductors carrying appropriate signals for the excitation of the material emitted by the row and column control means.

An image element of a display device according to the invention is a set of k image points, each image point corresponding to the association of an electrode of the first family and an electrode of the second family with a switch, the k image points of an image element being exposed at the same time to the same exciting signals. Although in the aforementioned known display devices, the term image element is equivalent to that of an image point, because each image element of one of said devices only comprises an image point corresponding to the association of an electrode with a switch or an electrode of a first family and an electrode of a second family with a switch.

The two groups of row electrodes per image element of the display device according to the invention are formed by a group of k electrodes of the first family and a group of k electrodes of the second family. The two column conductors per image element are formed by a column conductor of the first family and a column conductor of the second family.

Advantageously, the electro-optical material is a liquid crystal film, whose optical property is dependent on the electrical field applied thereto.

According to an embodiment of the display device, each switch $T_{ijl}$ with i, j and l being integers such that $1 \leq i \leq n$, $1 \leq j \leq m$ and $1 \leq l \leq k$ is a thin film transistor, whose gate is connected to the row conductor $N_i$, whereof the second terminal is connected to electrode $E_{ijl}$ of group $P_{ij}$ and whereof the third terminal is connected to electrode $E'_{ijl}$ of group $P'_{ij}$.

Preferably, the group of transistors associated with the electrodes of the first and second families corresponding to an image element are connected together by their gates, at least one of said transistors also being connected by its gate to the corresponding row conductor.

Advantageously, each row conductor is subdivided into first and second parts located on either side of the m groups of electrodes of the first family and the m groups of electrodes of the second family to which it is connected, the transistors associated with the electrodes of the first and second families corresponding to an image element, which are interconnected by their gates, are also connected by the gate of the transistor associated with the electrode of the first and the electrode of the second family juxtaposed with the first part of the row conductor to said first part and by the gate of the transistor associated with the electrode of the first and with the electrode of the second families juxtaposed with the second part of the row conductor to said second part.

According to an embodiment of the matrix display device, the electrodes of the first and second families of each image element are respectively formed by a conductive block and by a conductive excrescence or outgrowth, the outgrowth of an electrode of the first family being parallel and juxtaposed with the outgrowth of the electrode of the second family with which it is associated, the set of outgrowths of the electrodes of the first and second families being at least partly covered, successively by a layer of semi-conductive material, by a layer of an insulating material and by a layer of a conductive material, said three layers forming with the outgrowths of the electrodes of the means the transistors thereof.

Preferably, the semi-conductor material is amorphous silicon, the insulating material is e.g. a silicon nitride or oxide and the conductive material is a metal, such as aluminium or chromium.

Advantageously, between the outgrowths of the electrodes of the first and second families and the layer of semi-conductive material is placed a doped amorphous silicon layer.

According to another embodiment of the display device, the column conductors and/or electrodes of the first and second families are made from a transparent conductive material, such as e.g. indium oxide.

Advantageously, the spacing between the electrodes of a first group is equal to or less than a threshold value corresponding to the maximum spacing making it possible to integrate a fault associated with an electrode of the first family and an electrode of the second family connected by a switch. The spacing between the electrodes corresponds to the distance between one end of an electrode and the same end of an electrode adjacent thereto of the same group.

The invention also relates to a process for the control of a matrix display device, wherein for controlling the optical property of the material with image element $I_{ij}$ with i, j being integers such that $1 \leq i \leq n$ and $1 \leq j \leq m$, to the row conductor $N_i$ is applied a potential $V_{Gi}$ and to the column conductors $M_j$ and $M'_j$ of the first and second families, the potentials $V_R$ and $V_{Fj}$ with $V_{Gi} > V_R$, $V_{Gi} > V_{Fj}$ and $V_{Fj} \neq V_R$ for a row time $T1 = T/n$, T being the addressing period of an image element and with $V_{Gi} < V_R$ and $V_{Gi} < V_{Fj}$ outside said row time T1 and for the row time T1 is applied to the other row conductors a potential $V_{GS}$ and to the other column conductors the potentials $V_R$ and $V_{Fk}$, such that $V_{GS} < V_R$, $V_{GS} < V_{Fk}$ and $V_{GS} < V_{Gi}$.

BRIEF DESCRIPTION OF THE DRAWINGS

The invention is described in greater detail hereinafter relative to non-limitative embodiments and the attached drawings, wherein.

DETAILED DESCRIPTION OF THE PREFERRED EMBODIMENTS

Figure 2A:
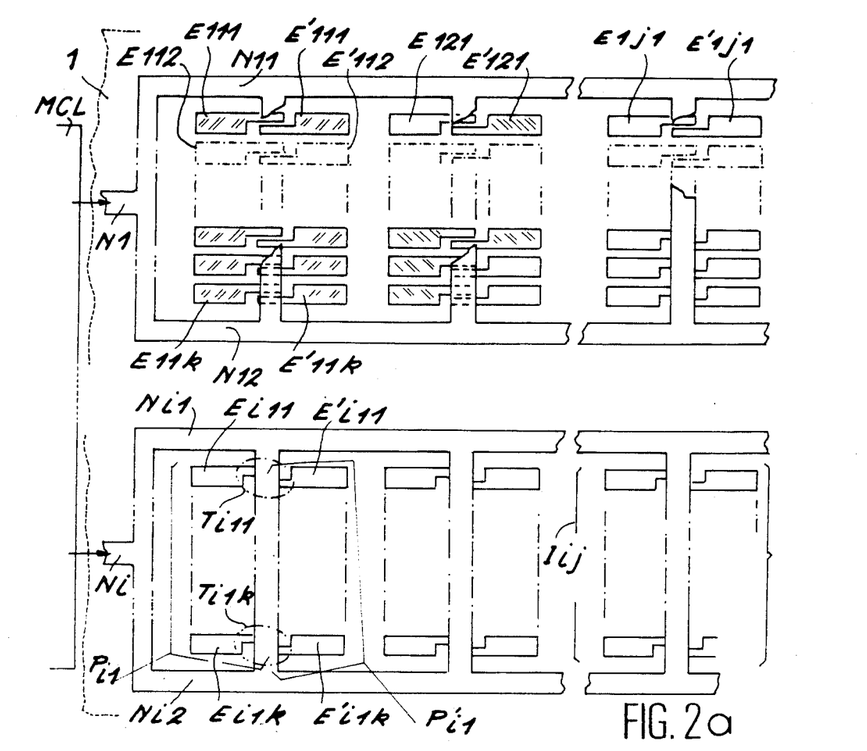
FIGS. 2a and 2b are diagrammatic views respectively of the inner faces of the first wall and the second wall of an embodiment of the display device according to the invention.

FIG. 2a shows the first wall 1 of a display device according to the invention. On the inner face of said wall are arranged n parallel row conductors $N_i$, each row conductor $N_i$ being subdivided into first and second conductive parts $N_{i1}$ and $N_{i2}$, with i being an integer such that $1 \leq i \leq n$. A first family of $n \times m \times k$ electrodes and a second family of $k \times m \times n$ electrodes are also disposed on the inner face of said wall. The $n \times m \times k$ electrodes of the first family $E_{ijl}$ are grouped into $m \times n$ groups $P_{ij}$ respectively having k parallel electrodes of the first family. In the same way the $n \times m \times k$ electrodes of the second family $E'_{ijl}$ are grouped into $m \times n$ groups $P'_{ij}$ respectively having k parallel electrodes of the first family with i, j, k being integers such that $1 \leq i \leq n$, $1 \leq j \leq m$ and $1 \leq l \leq k$.

Each row conductor $N_i$ is associated via its conductive parts $N_{i1}$ and $N_{i2}$ with m groups of electrodes of the first family and m groups of electrodes of the second family. The groups of electrodes of the first and second families are alternately arranged on wall 1 between conductive parts $N_{i1}$ and $N_{i2}$, the electrodes of said groups being disposed parallel to conductive parts $N_{i1}$ and $N_{i2}$.

Moreover, each electrode $E_{ijl}$ of a group $P_{ij}$ and each electrode $E'_{ijl}$ of a group $P'_{ij}$ are interconnected and to the corresponding row conductor $N_i$ by a switch $T_{ijl}$, such as a thin film transistor. In the remainder of the text, a description will be given of the particular example of a display means using transistors. The gate of transistor $T_{ijl}$ is connected to row conductor $N_i$, the second terminal of said transistor being connected to electrode $E_{ijl}$ and the third terminal of said transistor being connected to electrode $E'_{ijl}$. The second and third terminals of the transistor are respectively the source and drain thereof or the drain and source.

The set of transistors $T_{ij1} \ldots T_{ijk}$ associated with electrodes $E_{ij1} \ldots E_{ijk}$ of group $P_{ij}$ and electrodes $E'_{ij1} \ldots E'_{ijk}$ of group $P'_{ij}$ are interconnected by their gates. They are also connected to the row conductor $N_i$ by means of transistor $T_{ijl}$ and transistor $T_{ijk}$, linked by their gates respectively to parts $N_{i1}$ and $N_{i2}$ of said conductor. Thus, transistors $T_{ij1} \ldots T_{ijk}$ have a common gate connected to the row conductor $N_i$ by parts $N_{i1}$ and $N_{i2}$ of said conductor. The row conductors carry the electric signals emitted in a conventional manner by a row control means MCL making it possible either to select the conductive state or the non-conductive state of the transistors associated therewith.

Figure 2B:
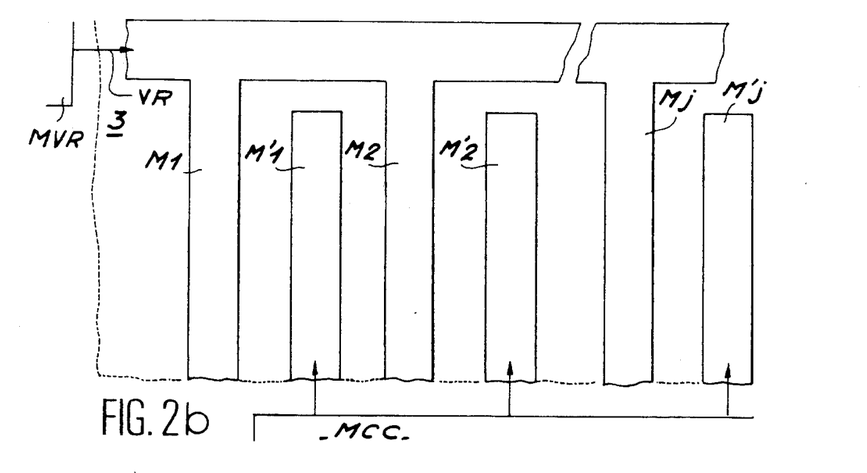

FIG. 2b shows the second wall 3 of the display device according to the invention. On the inner face of said wall are arranged a first family of m parallel column conductors $M_j$ raised to a reference potential $V_R$ by a polarizing means MVR and a second family of m parallel column conductors $M'_j$, which are independent and carry electrical signals conventionally emitted by a column control means MCC making it possible to excite the display material of the device according to the invention. Each column conductor of the first family is comprised between two conductors of the second family and vice versa.

In the example of the drawing, it is possible to see the column conductors of the first family interconnected and raised to a reference potential $V_R$ and the column conductors of the second family which are independent, but the reverse arrangement would also be possible.

When the inner faces of walls 1 and 3 face one another, the column conductors of the first and second families intersect with the row conductors. Each column conductor $M_j$ of the first family faces n groups $P_{1j} \ldots P_{nj}$ of k electrodes each of the first family and each column conductor $M'_j$ of the second family faces n groups $P'_{1j} \ldots P'_{nj}$ of k electrodes each of the second family, each group $P_{ij}$ and each group $P'_{ij}$ being connected by k transistors $T_{ijl} \ldots T_{ijk}$ to the row conductor $N_i$ via conductive parts $N_{i1}$ and $N_{i2}$.

An image element $I_{ij}$ of a display device according to the invention is consequently defined by the overlap zone between the k electrodes $E_{ijl} \ldots E_{ijk}$ of a group $P_{ij}$ and the column conductor $M_j$ and between the k electrodes $E'_{ijl} \ldots E'_{ijk}$ of a group $P'_{ij}$ and the column conductor $M'_j$, each electrode $E_{ijl}$ and each electrode $E'_{ijl}$ being interconnected and connected to the row conductor $N_i$ by a transistor $T_{ijl}$. It would also have been possible to define an image element $I_{ij}$ by the overlap zone of k electrodes $E_{ijl} \ldots E_{ijk}$ and the column conductor $M'_j$ and k electrodes $E'_{ijl} \ldots E'_{ijk}$ and the column conductor $M_j$.

In other words, an image element $I_{ij}$ is formed from k image points $I_{ijl} \ldots I_{ijk}$, each image point $I_{ijl}$ being defined by the overlap zone of electrode $E_{ijl}$ and the column conductor $M_j$ and electrode $E'_{ijl}$ and column conductor $M'_j$.

When the display device according to the invention is considered by transmission, walls 1 and 3 are transparent, as are the electrodes and column conductors. However, when the display device according to the invention is considered by reflection, it is sufficient for the wall closest to the observer to be transparent, as are the column conductors and electrodes associated therwith. However, obviously, walls 1 and 3, the column conductors and the electrodes of the display device can be transparent. The transparent material constituting the electrodes and/or the column conductors is e.g. indium oxide.

Figure 3A:
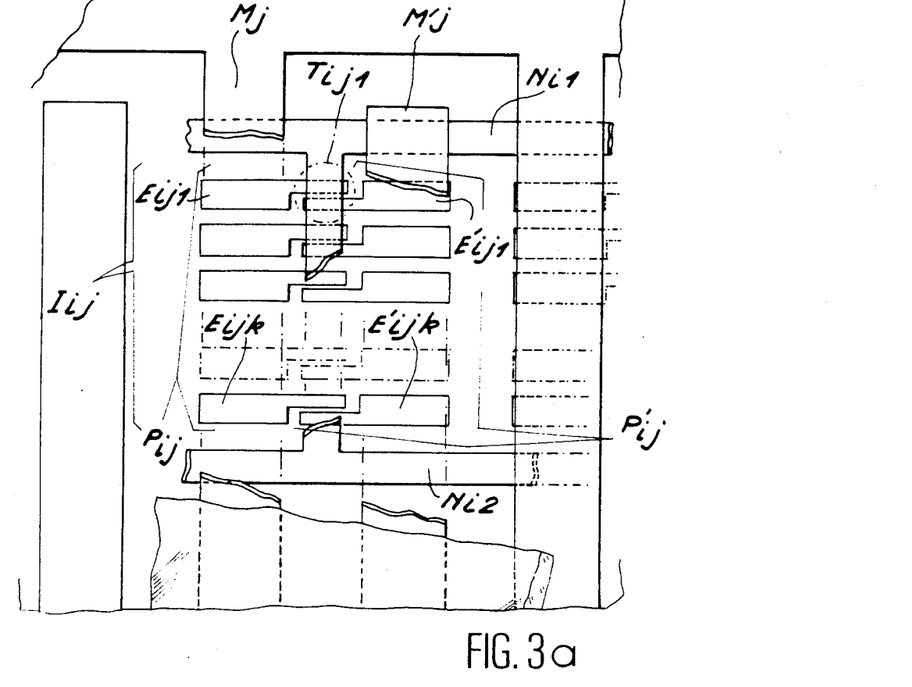
FIGS. 3a, 3b and 3c are diagrammatic views respectively of an image element of the display device according to FIGS. 2a and 2b, an exploded view of the structure of said image element and the equivalent circuit diagram of said image element.
Figure 3B:
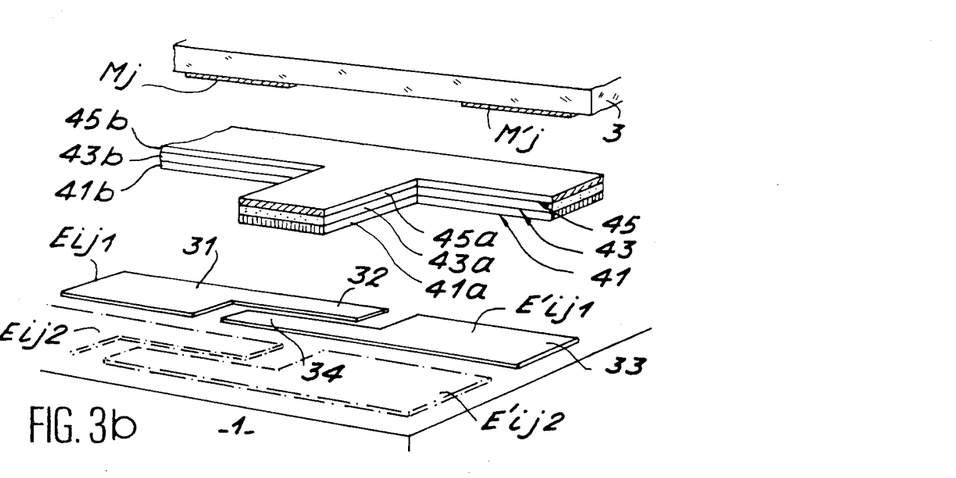

FIG. 3a shows an image element $I_{ij}$ of a display device according to the invention and FIG. 3b an exploded view of said image element.

A group $P_{ij}$ of k electrodes $E_{ijl} \ldots E_{ijk}$ of the first family and a group $P'_{ij}$ of k electrodes $E'_{ijl} \ldots E'_{ijk}$ of the second family respectively face a column conductor $M_j$ of the first family and a column conductor $M'_j$ of the second family with i and j being integers such that $1 \leq i \leq n$ and $1 \leq j \leq m$. Electrodes $E_{ijl} \ldots E_{ijk}$ of group $P_{ij}$ are parallel to one another and between parts $N_{i1}$ and $N_{i2}$ of the row conductor $N_i$. This also applies with respect to electrodes $E'_{ijl} \ldots E'_{ijk}$ of group $P'_{ij}$.

Each electrode $E_{ijl}$ of the first family and each electrode $E'_{ijl}$ of the second family with l being an integer such that $1 \leq l \leq k$ is formed by a rectangular conductive block 31,33 and by an also conducted excrescence or outgrowth 32,34 (FIG. 3b). The outgrowths of electrodes $E_{ijl}$ and $E'_{ijl}$ corresponding to an image point are complimentary so as to be juxtaposed and parallel to one another.

For this purpose, the width of each outgrowth is e.g. less than half the width of a conductive block. Moreover, column conductor $M_j$ faces the conductive block 31 of electrode $E_{ijl}$ and column conductor $M'_j$ faces the conductive block 33 of electrode $E'_{ijl}$.

Outgrowths 32,34 of electrodes $E_{ijl}$ and $E'_{ijl}$ of an image point are at least partly covered by three superimposed layers, namely a layer 41a of a semi-conductive material, such as an amorphous silicon layer, a layer 43a of an insulating material, such as a layer of silicon nitride or oxide and a layer 45a of a conductive material, such as an aluminium or chromium layer.

Advantageously, between outgrowths 32,34 of the electrodes and layer 41a is introduced a doped amorphous silicon layer of approximately 200 Angstroms in order to reduce the contact resistance between layer 41a and outgrowths 32,34. The three layers 41a, 43a, 45a, with the outgrowths 32,34 of electrodes $E_{ijl} E'_{ijl}$ of an image point $I_{ijl}$ constitutes transistor $T_{ijl}$ associated with said image point. Outgrowths 32,34 form either the source or the drain of said transistor and layer 45a the gate thereof.

These three layers 41a, 43a, 45a are arranged on the system of outgrowths of electrodes $E_{ijl} \ldots E_{ijk}$ and $E'_{ijl} \ldots E'_{ijk}$ of an image element in such a way that the group of transistors $T_{ijl} \ldots T_{ijk}$ associated with these electrodes are interconnected by their gates, or in other words have a common gate formed by layer 45a.

Moreover, a layer 41b of semi-conductive material, a layer 43b of insulating material and a layer 45b of conductive material are also disposed on wall 1, so as to form the row conductors $N_i$, subdivided respectively into two parts $N_{i1}$ and $N_{i2}$. Thus, on either side of groups $P_{ij}$ and $P'_{ij}$ of an image element are arranged layers 41b, 43b and 45b perpendicularly to layers 41a, 43a and 45a positioned on the outgrowths of the electrodes corresponding to said image element and in contact with said layers. Thus, the gate of transistor $T_{ijl}$ of an image element is electrically connected to the conductive layer 45b of part $N_{i1}$ of row conductor $N_i$ and the gate of transistor $T_{ijk}$ is electrically connected to the conductive layer 45b of part $N_{i2}$ of row conductor $N_i$.

Layer 41a and layer 41b are preferably produced at the same time using the same material. Thus, these two layers constitute a single layer designated 41. This also applies with respect to layers 43a and 43b which form a single layer 43 and layers 45a and 45b which form a single layer 45.

Thus, for example, after producing all the electrodes of the display device on wall 1 by the deposition of a metal layer and then by etching through an appropriate mask of said layer are successively deposited a semiconductive material layer, an insulating material layer and a conductive material layer on wall 1 above the electrodes. This is followed by etching through an appropriate mask the said three layers in order to obtain superimposed layers 41, 43, 45 forming the row conductors of the means and, with the outgrowths of the electrodes of the means, the transistors of the latter. Thus, the realization of such a display device only involves two masking levels.

This embodiment is obviously not limitative. Thus, advantageously, the row conductors $N_i$ can be formed solely by layer 45b of conductive material connected to layer 45a. In this case, the realization of the electrodes and layers 41a, 43a, 45a and 45b requires three masking levels.

The redundancy of the image points per image element in a display device according to the invention makes it possible to integrate possible defective image points, or in other words not to display the defective image points, provided that, as will be shown hereinafter, the spacing between the electrodes of the same group is equal to or less than a threshold value. Thus, if a transistor $T_{ijl}$ of an image element $I_{ij}$ is defective, it will have no effect on the other transistors of the image points associated with said image element due to the fact that only its gate is connected to the gates of the other transistors. Thus, a short-circuit between the gate and an outgrowth 32 or 34 brings the corresponding block 31 or 33 to the gate voltage, but does not modify the value of said gate voltage.

Figure 3C:
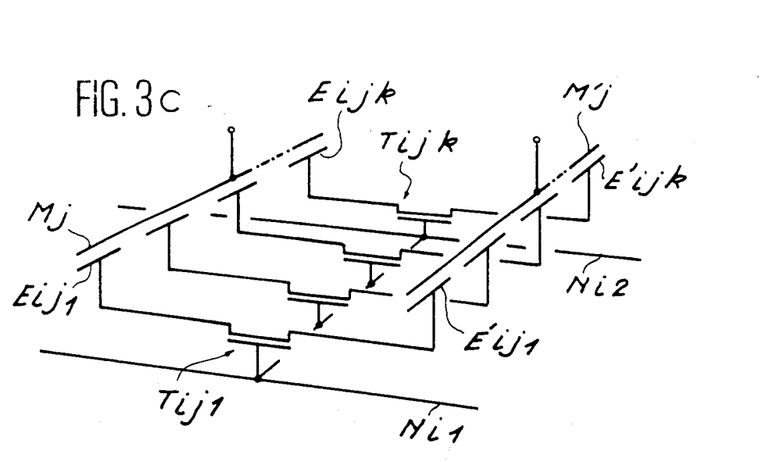

FIG. 3c shows the equivalent circuit diagram of an image element $I_{ij}$.

Electrode $E_{ijl}$ of an image point $I_{ijl}$ and column conductor $M_j$ form the coatings of a capacitor $C_{ijl}$, whose display material inserted between these coatings forms the dielectric. The same applies with regards to electrode $E'_{ijl}$ of image point $I_{ijl}$ and conductor $M'_j$, which form the coatings of capacitor $C'_{ijl}$. Thus, each image point $I_{ijl}$ is equivalent to two capacitors $C_{ijl}$ and $C'_{ijl}$. The column conductors $M_j$ and $M'_j$ respectively facing electrodes $E_{ijl} \ldots E_{ijk}$ and $E'_{ijl} \ldots E'_{ijk}$ respectively form a coating common to the group of capacitors $C_{ijl} \ldots C_{ijk}$ and the group of capacitors $C'_{ijl} \ldots C'_{ijk}$.

Moreover, this drawing shows the transistors $T_{ijl} \ldots T_{ijk}$ respectively associated with electrodes $E_{ijl}, E'_{ijl} \ldots E_{ijk}, E'_{ijk}$ of the image points $I_{ijl} \ldots I_{ijk}$. The gates of these transistors are connected to one another and to the row conductor $N_i$ via part $N_{i1}$ of said conductor, connected to gate of transistor $T_{ijl}$ and part $N_{i2}$ of said conductor connected to the gate of transistor $T_{ijk}$.

An image element $I_{ij}$ is controlled in the same way as an image point described in FR-A-2581783. However, instead of selecting the conductive state of a single transistor associated with an image point, one selects the conductive state of the group of transistors corresponding to the image points of an image element of the display device according to the invention.

Thus, for controlling the optical property of the material with the image element $I_{ij}$, or in other words image points $I_{ijl} \ldots I_{ijk}$, to the row conductor N, is applied a potential $V_{Gi}$ for selecting the conductive state of transistors $T_{ijl} \ldots T_{ijk}$ associated with said element and to column conductors $M_j$ and $M'_j$ the potentials $V_R$ and $V_{Fj}$ such that $V_{Gi} > V_R$, $V_{Gi} > V_{Fj}$ and $V_{Fj} \neq V_R$ during a row time $T_1 = T/n$ and $V_{Gi} < V_R$ and $V_{Gi} < V_{Fj}$ outside said row time, T being the addressing period of an image element and n the number of rows of the device. Moreover, during the row time $T_1$ is applied to the other row conductors a potential $V_{GS}$ for blocking the group of transistors associated with said row conductors and to the other column conductors the potentials $V_R$ and $V_{Fk}$, such that $V_{GS} < V_R$, $V_{GS} < V_{Fk}$ and $V_{GS} < V_{Gi}$. The potential difference between the coating of capacitors $C_{ijl}, C'_{ijl} \ldots C_{ijk}, C'_{ijk}$ corresponding to said image element $I_{ij}$ is consequently equal to $(V_{Fj} - V_R)/2$.

Figure 4A:
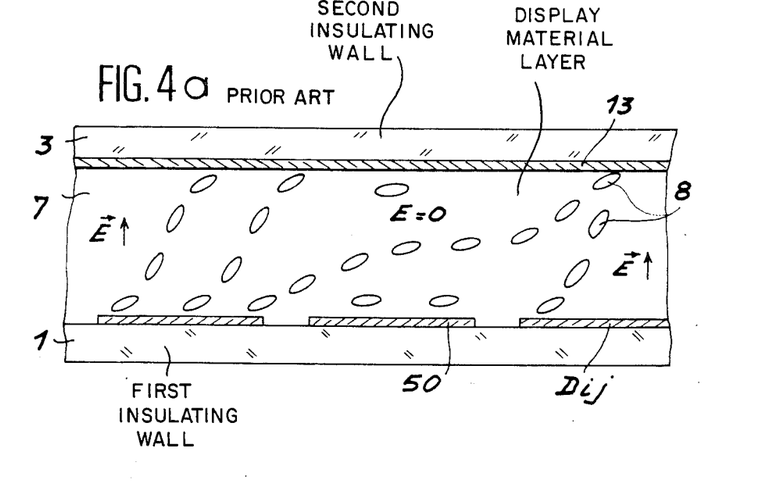
FIGS. 4a and 4b are diagrammatic sectional views in section of the orientation of the molecules of the display material respectively in a known display device and in a display means according to the invention having a defective image point.
Figure 4B:
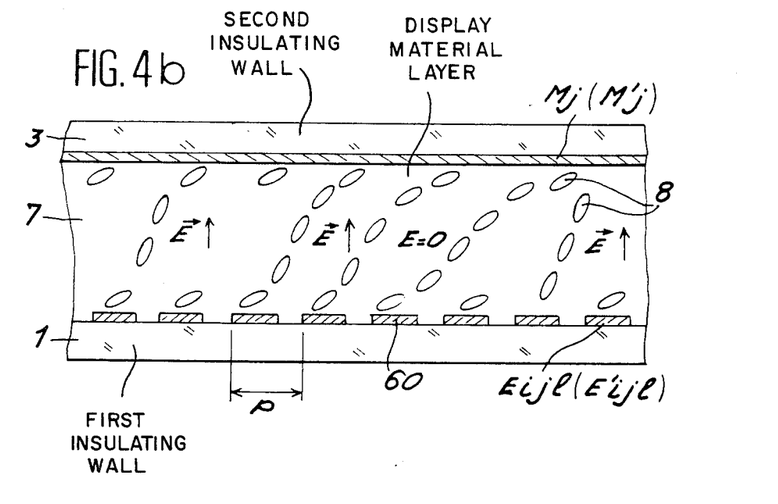

FIGS. 4a and 4b diagrammatically show in section respectively a known display means and a display device according to the invention.

In FIG. 4a the image point or an image element is defined by the zone of the display material, particularly the liquid crystal, inserted between an electrode $D_{ij}$ and the counterelectrode 13, whereas in FIG. 4b an image point $I_{ijl}$ is defined by the zone of the display material inserted between electrodes $E_{ijl}, E'_{ijl}$ and the column conductors $M_j, M'_j$, an image element $I_{ij}$ being defined by the image points $I_{ijl} \ldots I_{ijk}$. In view of the fact that FIG. 4b is a diagrammatic section of the display device according to the invention, as a function of the width of the electrodes, only one of the electrodes $E_{ijl}$ or $E'_{ijl}$ as well as one of the column conductors $M_j$ or $M'_j$ are shown therein.

When an electrical field is produced between electrode $D_{ij}$ and electrode 13, molecules 8 of display material 7, such as liquid crystal molecules, are oriented with respect to said field. When an electrode 50 is defective, there is no electrical field between said electrode 50 and the counterelectrode 13, so that the molecules inserted between electrode 50 and counterelectrode 13 are not oriented and the defective image point corresponding to electrode 50 will be seen by an observer.

However, as shown in FIG. 4b, in the display device according to the invention, the spacing p between one end of an electrode $E_{ijl}$ or $E'_{ijl}$ and the same end of an adjacent electrode, e.g. $E_{ij(l+1)}$ or $E'_{ij(l+1)}$ is equal to or less than the threshold value making it possible to integrate a defective image point with the other image points of the same image element. Therefore the width of each electrode of an image element is well below that of an electrode of an image point or element of a known means and the different electrodes of a group of an image element are very close to one another.

Thus, when an image point corresponding to an electrode 60 is defective, the electrical field between electrodes $E_{ijl}, E'_{ijl}$ and column conductors $M_j M'_j$ corresponding to said image point is zero. However, the molecules 8 of material 7 inserted between the electrodes and the column conductors corresponding to said defective image point are subject to the electrical fields of adjacent image points. Thus, the molecules of the defective image point tend to have the same orientation as that of the molecules of the adjacent image points. Moreover, the image points of an image element are very close to one another, so that an observer is unable to see the difference between a poor image point and a good image point.

The threshold value of the spacing making it possible to integrate a poor image point, or in other words, not to display a defective image point, is dependent on the thickness of the display means, i.e. the thickness between the two outer faces of walls 1,3, the electrical constants of the display material, the voltages applied to the row and column conductors, the dielectric anisotropy of the display material and finally the nature of the anchoring or locking of the molecules of the display materials to the walls.

For example, in the case of thicknesses of the liquid crystal display means of approximately 5 to 10 μm, for electric constants of the liquid crystal of 4 to 20 in the CGS system, for voltages applied to the row and column conductors of approximately 5 volts, for a dielectric anisotropy of the liquid crystal of −5 to 10 in the CGS system and for planar or homeotropic locking, the integration is effective when the spacing between two adjacent electrodes of the same group is less than 100 μm and is e.g. equal to 10 μm.

The electro-optical effects compatible with the integrator effect of the display device according to the invention are in particular helical nematics, electrically controlled birefringence effect, dichromacy effects in homogenous orientation, of both a planar and hemeotropic or hybrid nature.

Thus, the display device according to the invention avoids the display of image points and elements of a defective nature by the redundancy of image points per image element and by a spacing between the image points of an image element equal to or less than a threshold value, without increasing the number of stages for producing the display device compared with that of a known device witout any tests during manufacture. Furthermore, the redundancy of the control of the transistor gates of a row of image elements by the two parts of the corresponding row conductor avoids the deficiency of the complete corresponding image element row in the case of a breaking of one of these parts.

Obviously the embodiment of the display device according to the invention described hereinbefore is not limitative. Thus, numerous variants are possible without passing beyond the scope of the invention.

What is claimed is:

1. A matrix display device comprising an electro-optical material having an optical property inserted between first and second insulating walls, whereof at least one is transparent and which are kept spaced from one another, wherein on the inner face of the first wall are arranged n parallel row conductors, each row conductor being connected by $k \times m$ switches to $k \times m$ electrodes of a first family grouped into m groups of k parallel electrodes each and $k \times m$ electrodes of a second family grouped into m groups of k parallel electrodes each, the m groups of electrodes of the first family and the m groups of electrodes of the second family being juxtaposed with said row conductor and alternating with one another in such a way that each electrode $E_{ijl}$ of a group $P_{ij}$ of electrodes of the first family and each electrode $E'_{ijl}$ of a group $P'_{ij}$ of electrodes of the second family are connected by a switch $T_{ijl}$ to a row conductor $N_i$ with i, j and l being integers such that $1 \leq i \leq n$, $1 \leq j \leq m$ and $1 \leq l \leq k$ and wherein on the inner face of the second wall are arranged a first family of m parallel column conductors and a second family of m parallel column conductors, the column conductors of the second family alternating with the column conductors of the first family, one of the two families of column conductors being raised to a reference potential by a polarizing means, the column conductors of the first and second families intersecting with the row conductors, each column conductor of the first family facing n groups of electrodes of the first family and each column conductor of the second family facing n groups of electrodes of the second family, an image element being defined by the overlap zone of two column conductors respectively of the first and second families with respectively a group of k electrodes of the first family and a group of k electrodes of the second family connected by k switches to the corresponding row conductor, said conductors carrying appropriate signals for the excitation of the material emitted by the row and column control means.

2. A display device according to claim 1, wherein the electrooptical material is a liquid crystal film, whose optical property is dependent on the electrical field applied thereto.

3. A display device according to claim 2, wherein each switch $T_{ijl}$ with i, j and l being integers such that $1 \leq i \leq n$, $1 \leq j \leq m$ and $1 \leq l \leq k$ is a thin film transistor, whose gate is connected to the row conductor $N_i$, whereof the second terminal is connected to electrode $E_{ijl}$ of group $P_{ij}$ and whereof the third terminal is connected to electrode $E'_{ijl}$ of group $P'_{ij}$.

4. A display device according to claim 3, wherein the set of transistors associated with the electrodes of the first and second families corresponding to an image element are interconnected by their gate, at least one of the said transistors also being connected by its gate to the corresponding row conductor.

5. A display device according to claim 3, wherein each row conductor is subdivided into first and second parts located on either side of the m groups of electrodes of the first family and the m groups of electrodes of the second family to which it is connected, the transistors associated with the electrodes of the first and second families corresponding to an image element, which are interconnected by their gate, are also connected by the gate of the transistor associated with the electrode of the first and the electrode of the second family juxtaposed with the first part of the row conductor to said first part and by the gate of the transistor associated with the electrode of the first and with the electrode of the second families juxtaposed with the second part of the row conductor to said second part.

6. A display device according to claim 3, wherein the electrodes of the first and second families of each image element are respectively formed by a conductive block and by a conductive excrescence or outgrowth, the outgrowth of an electrode of the first family being parallel and juxtaposed with the outgrowth of the electrode of the second family with which it is associated, the set of outgrowths of the electrodes of the first and second families being at least partly covered, successively by three material layers, namely a layer of semiconductive material, a layer of an insulating material and a layer of a conductive material, said three layers forming with the outgrowths of the electrodes of the means the transistors thereof.

7. A display device according to claim 6, wherein the semi-conductor material is amorphous silicon.

8. A display device according to claim 7, wherein a doped amorphous silicon layer is inserted between the outgrowths of the electrodes of the first and second families and the layer of semi-conductive material.

9. A display device according to claim 1, wherein the column conductors and/or electrodes of the first and second families are made from a transparent conductive material.

10. A display device according to claim 1, wherein the spacing between the electrodes of the same group is equal to or less than a threshold value corresponding to the maximum spacing making it possible to integrate a fault associated with an electrode of the first family and an electrode of the second family connected by a switch.

11. A process for the control of a display device according to claim 1, wherein for controlling the optical property of the material with image element $I_{ij}$ with i, j being integers such that $1 \leq i \leq n$ and $1 \leq j \leq m$, to the row conductor $N_i$ is applied a potential $V_{Gi}$ and to the column conductors $M_j$ and $M'_j$ of the first and second families, the potentials $V_R$ and $V_{Fj}$ with $V_{Gi} > V_R$, $V_{Gi} > V_{Fj}$ and $F_{Fj} \neq V_R$ for a row time $T1 = T/n$, T being the addressing period of an image element and with $V_{Gi} < V_R$ and $V_{Gi} < V_{Fj}$ outside said row time $T1$ and for the row time $T1$ is applied to the other row conductors a potential $V_{GS}$ and to the other column conductors the potentials $V_R$ and $V_{Fk}$, such that $V_{GS} < V_R$, $V_{GS} < V_{Fk}$ and $V_{GS} < V_{Gi}$.

* * * * *